UNITED STATES PATENT OFFICE.

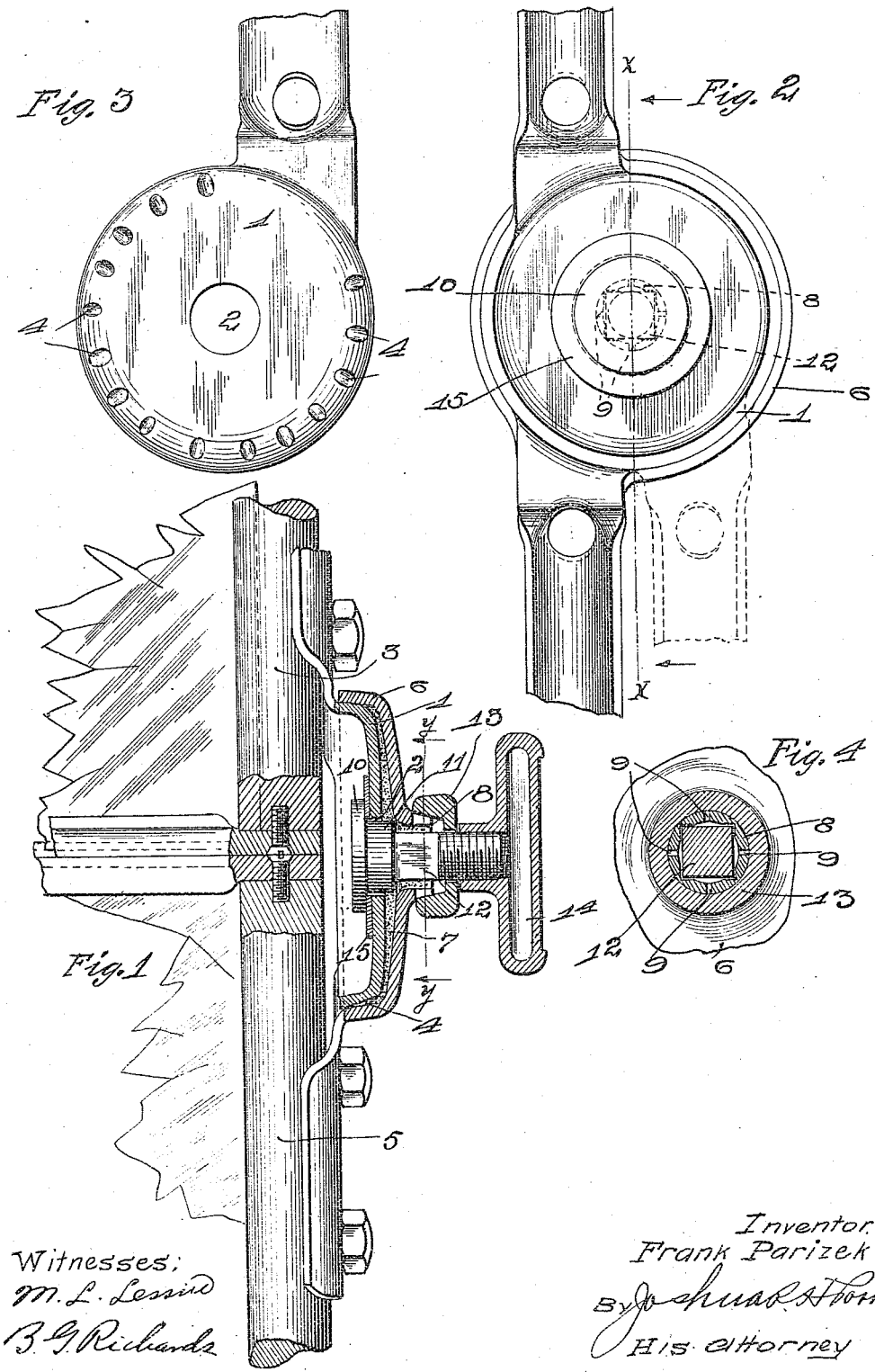

FRANK PARIZEK, OF CHICAGO, ILLINOIS, ASSIGNOR TO UNIVERSAL WIND SHIELD COMPANY, OF CHICAGO, ILLINOIS.

WIND-SHIELD.

973,206.

Specification of Letters Patent. Patented Oct. 18, 1910.

Application filed May 13, 1910. Serial No. 561,212.

*To all whom it may concern:*

Be it known that I, FRANK PARIZEK, a citizen of the United States, residing at Chicago, county of Cook, and State of Illinois, have invented certain new and useful Improvements in Wind-Shields, of which the following is a specification.

My invention relates to improvements in wind shields, particularly to the hinge joint for foldable wind shields and the object of the invention is to provide an improved hinge joint for wind shields which shall be of durable construction and efficient in operation.

The invention consists in the combination and arrangement of parts hereinafter described and claimed.

The invention will be best understood by reference to the accompanying drawings forming a part of this specification, and in which—

Figure 1 is a sectional elevation of a hinge joint for wind shields illustrating a hinge joint embodying my invention, a sectional portion of the same being taken on line $x$—$x$ of Fig. 2, Fig. 2, an interior elevation of a hinge joint detached from the wind shield frame, Fig. 3, an outer elevation of one of the hinge joint members, and Fig. 4, a section on line $y$—$y$ of Fig. 1.

The preferred form of construction as illustrated in the drawings comprises a conical projection 1 having a central aperture 2 and bolted to the side rail 3 of one member of a foldable wind shield. The conical edges of projection 1 are provided with lubricating grooves 4 as shown. Bolted to the side rail 5 of the adjoining member of the wind shield frame is a conical cup-like member 6 of a size to embrace and closely fit projection 1 and of a form to leave a space 7 between the outer end of projection 1 and the bottom of said cup and communicating with lubricating notches 4. In use space 7 is filled with a semi-solid lubricating material such as graphite mixed with oil. Cup member 6 is provided with an outwardly tapering central hub 8 provided with a squared central aperture and radial slits 9. Members 1 and 6 are held together by means of a bolt having an inner head 10 and a cylindrical shank 11 passing through the central aperture 2 in member 1 and a squared portion 12 passing through the hub 8 of member 6. A cup-like tapering washer 13 is placed over hub 8 and a hand wheel 14 is threaded on the outer end of said bolt to contact with the outer side of washer 13. A fiber washer 15 is inserted between bolt member 10 and the inner side of projection 1 to better confine the lubricant. By this construction it will be seen that the contacting portions of members 1 and 6 will always be thoroughly lubricated thus preventing " cutting " or undue sticking thereof. The squared portion 12 of the bolt contacting through the squared aperture in hub 8 will prevent rotation of said bolt and thus prevent hand wheel 14 from working loose. Washer 13 will automatically take up any lost motion between hub 8 and bolt portion 12 due to wear thus preventing rattling.

While I have illustrated and described the preferred form of construction for carrying my invention into effect this is capable of variation or modification without departing from the spirit of the invention. I, therefore, do not wish to be limited to the exact details set forth but desire to avail myself of such variations and modifications as come within the scope of the appended claims.

Having described my invention what I claim as new and desire to secure by Letters Patent is:

1. The combination with the foldable members of a wind shield, of a conical projection secured to one of said members and provided with peripheral lubricating notches; a conical cup secured to the other of said members and embracing said projection, the said projection and cup being so formed as to leave a lubricant space between the end of said projection and the bottom of said cup communicating with said notches; and means for drawing said projection and cup together, substantially as described.

2. The combination with the foldable members of a wind shield, of a conical projection secured to one of said members and provided with peripheral lubricating notches, the said projection having a central aperture; a conical cup secured to the other of said members and embracing said projection, the said cup being provided with a central outwardly tapering slitted hub having a square aperture; a bolt having an inner head and rounded shank passing through the aperture in said projection and a squared portion passing through said hub; a tapering cup-like washer fitting over said hub; and a hand member threaded on the outer end of said bolt and contacting with said washer, substantially as described.

3. The combination with the foldable members of a wind shield, of a conical projection secured to one of said members and provided with peripheral lubricating notches, the said projection having a central aperture; a conical cup secured to the other of said members and embracing said projection, the said projection and cup being so formed as to leave a lubricant space between the end of said projection and the bottom of said cup communicating with said notches, and the said cup being provided with a central outwardly tapering slitted hub having a squared aperture; a bolt having an inner head and rounded shank passing through the aperture in said projection and a squared portion passing through said hub; a tapering cup-like washer fitting over said hub; and a hand member threaded on the outer end of said bolt and contacting with said washer, substantially as described.

4. The combination with the foldable members of a wind shield, of a conical projection secured to one of said members and having a central aperture; a conical cup secured to the other of said members and embracing said projection, the said cup being provided with a central outwardly tapering slitted hub having a squared aperture; a bolt having an inner head and rounded shank passing through the aperture in said projection and a squared portion passing through said hub; a tapering cup-like washer fitting over said cup; and a hand member threaded on the outer end of said bolt and contacting with said washer, substantially as described.

In testimony whereof I have signed my name to this specification in the presence of two subscribing witnesses.

FRANK PARIZEK.

Witnesses:
   HELEN F. LILLIS,
   JOSHUA R. H. POTTS.